United States Patent
Richards et al.

(10) Patent No.: US 11,113,408 B2
(45) Date of Patent: Sep. 7, 2021

(54) PROVIDING A SECURE OBJECT STORE USING A HIERARCHICAL KEY SYSTEM

(71) Applicant: HEWLETT PACKARD ENTERPRISE DEVELOPMENT LP, Houston, TX (US)

(72) Inventors: Gareth David Richards, Woodstock (GB); Michael William Francis Healey, Jr., Westborough, MA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 293 days.

(21) Appl. No.: 16/105,214

(22) Filed: Aug. 20, 2018

(65) Prior Publication Data
US 2020/0057859 A1    Feb. 20, 2020

(51) Int. Cl.
| | |
|---|---|
| G06F 21/60 | (2013.01) |
| G06F 21/62 | (2013.01) |
| H04L 9/08 | (2006.01) |
| H04L 9/14 | (2006.01) |

(52) U.S. Cl.
CPC .......... *G06F 21/602* (2013.01); *G06F 21/62* (2013.01); *H04L 9/0861* (2013.01); *H04L 9/14* (2013.01)

(58) Field of Classification Search
CPC ..... G06F 21/602; G06F 21/62; H04L 9/0861; H04L 9/14; H04L 9/085; H04L 9/0822; H04L 9/0894; H04L 9/0836; H04L 63/06
See application file for complete search history.

(56) References Cited

U.S. PATENT DOCUMENTS

| | | | | |
|---|---|---|---|---|
| 7,362,870 B2* | 4/2008 | Okaue | ........ | G11B 20/0021 380/281 |
| 9,288,042 B1 | 3/2016 | Madhukar et al. | | |
| 9,529,998 B2 | 12/2016 | O'Hare et al. | | |
| 9,703,965 B1 | 7/2017 | Robinson et al. | | |
| 2004/0156508 A1* | 8/2004 | Tada | ........ | H04L 9/0836 380/281 |
| 2008/0210747 A1* | 9/2008 | Takashima | ........ | G06F 21/64 235/375 |
| 2008/0263370 A1* | 10/2008 | Hammoutene | ........ | G06F 21/6245 713/193 |
| 2009/0252330 A1* | 10/2009 | Patnala | ........ | H04L 9/0825 380/279 |

(Continued)

OTHER PUBLICATIONS

Extended European Search Report received for EP Patent Application No. 19189868.3, dated Dec. 20, 2019, 07 pages.

(Continued)

*Primary Examiner* — Meng Li
(74) *Attorney, Agent, or Firm* — Nolte Lackenbach Siegel

(57) ABSTRACT

A method for use in managing a secure object store in a computing system includes: securing the secure object store including creating, maintaining, and using a hierarchical key system and accessing an encrypted data object using the Node Key Encryption Key and a selected one of the Data Encryption Keys. The securing includes: generating a Node Key Encryption Key; generating a plurality of Data Encryption Keys that are encrypted using the Node Key Encryption Key; and encrypting a plurality of data objects using the Data Encryption Keys, each data object being encrypted by a respective Data Encryption Key.

21 Claims, 6 Drawing Sheets

(56) References Cited

U.S. PATENT DOCUMENTS

| | | | |
|---|---|---|---|
| 2012/0072723 A1* | 3/2012 | Orsini | H04L 63/10 |
| | | | 713/165 |
| 2016/0119349 A1* | 4/2016 | Wang | G06F 21/6218 |
| | | | 713/168 |
| 2017/0005797 A1 | 1/2017 | Lanc et al. | |
| 2017/0250966 A1* | 8/2017 | White | H04L 63/062 |
| 2018/0041336 A1 | 2/2018 | Keshava et al. | |

OTHER PUBLICATIONS

Microsoft, "Key Vault," 2018, pp. 1-5 (online), Retrieved from the Internet on May 15, 2018 at URL: <azure.microsoft.com/en-in/services/key-vault/>.

* cited by examiner

PROVIDING A SECURE OBJECT STORE USING A HIERARCHICAL KEY SYSTEM

BACKGROUND

One aspect of computing is "security" of information. Generally, access to information is controlled in order to secure the information. That is, the information is secured by authorizing access to certain users and denying access to others. One way to do this is for a user to "identify" themselves and "authenticate" their right to access the information. Note that the user may be a person or a software component such as a process or a service. Identity and authentication information are frequently stored as "data objects" or "objects" in what are called "secured stores" or "vaults".

BRIEF DESCRIPTION OF THE DRAWINGS

Examples described herein may be understood by reference to the following description taken in conjunction with the accompanying drawings, in which like reference numerals identify like elements.

Figure 1:
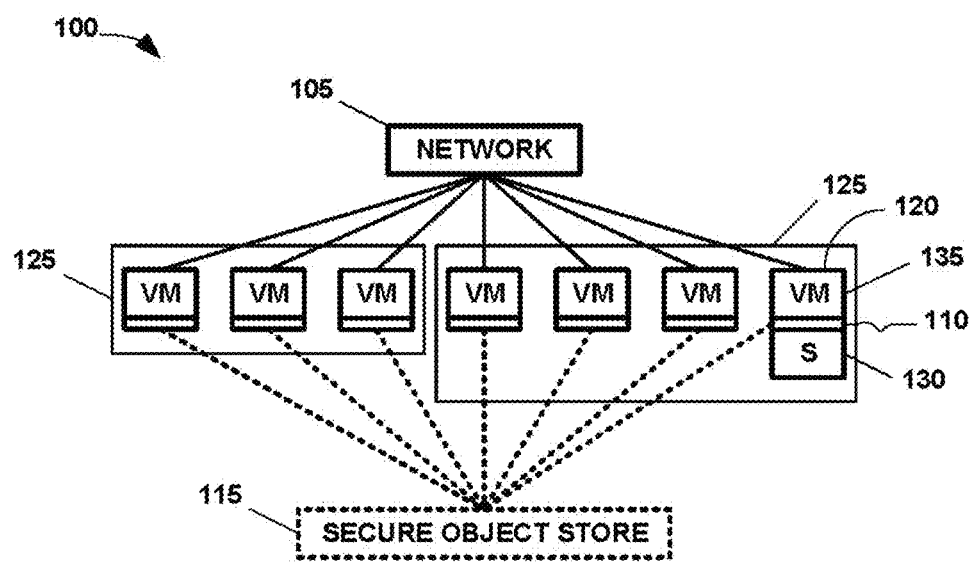
FIG. 1 conceptually depicts a computing system in accordance with one or more examples of the technique disclosed herein.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions will be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

One current technique for, securing information in a secure storage relies on custom hardware that is physically installed and accessible on the node on which the secured object store is deployed. The protected information is more particularly stored in a serializable hash map which is persisted to disk and encrypted under a key generated from a hash of the serial number of the custom hardware and a unique identifier such as a Global Unique Identifier ("GUID"). There are several issues with this approach. One issue is that it does not work for virtual machines ("VMs") that do not have access to the custom hardware (and the serial number, in particular). The data is stored as a single encrypted "blob" which does not easily support the secure sharing of stored data across a cluster. There also is no, access control on the stored data—any client can request any stored object.

The presently disclosed technique improves the operation of a computing system in light of the issues discussed above in at least three ways. The technique employs a hierarchical key system that supports multiple methods of generating the top-level key used to protect the stored data that do not depend on the presence of a custom hardware. The technique allows for the secure sharing of encrypted data stored in the vault or secure object store between nodes in a cluster. The technique allows for access control rules to be associated with the data in the secured object store so as to restrict access to authorized clients or users.

The first improvement is achieved by replacing the method of generating the encryption key. A "randomly" generated Node Key Encryption Key will be used that is stored wrapped under one or more Unlock Key Encryption Keys. The Unlock Key Encryption Keys will be generated by a corresponding unlock protocol and the design allows for multiple unlock protocols to be supported. Under this scheme, the top-level Node Key Encryption Key can be recovered and the data in the store accessed if at least one of the unlock protocols is available.

The second improvement is achieved by changing the way that the data is encrypted. Instead of encrypting the entire store under a single key, each stored object will instead be encrypted under its own random Data Encryption Key. The sharing of stored data will then be achieved by optionally encrypting the Data Encryption Keys under shared Storage Class Key Encryption Keys. If a stored object is shared between nodes in the system, then, the object's Data Encryption Key will be encrypted under a Storage Class Key Encryption Key shared by those nodes. The Storage Class Key is then stored on each node, encrypted under that node's Node Key Encryption Key. If the stored object is not shared, then the Data Encryption Key is encrypted directly under the local node's Node Key Encryption Key.

The third improvement is achieved by encrypting the individual data objects within the secured object store using the Data Encryption Key rather than as just one part of a "blob" comprised of all the data objects in the secure data store. Thus, access control rules are individually associated with the data in the secured object store so as to restrict access to authorized clients or users. Clients or users that access the secure data store but are not authorized to access that particular data object will then be denied.

Figure 2:
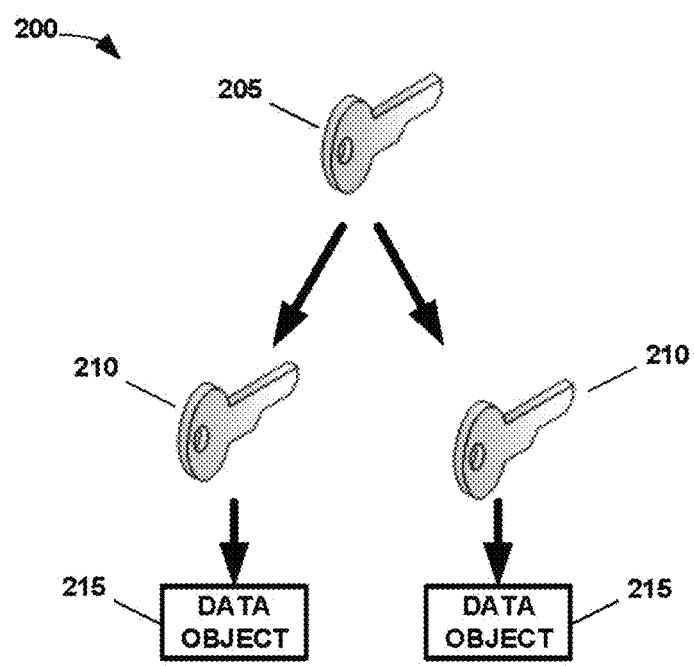
FIG. 2 illustrates an example hierarchical key system in which secured data objects are local data objects.
Figure 3:
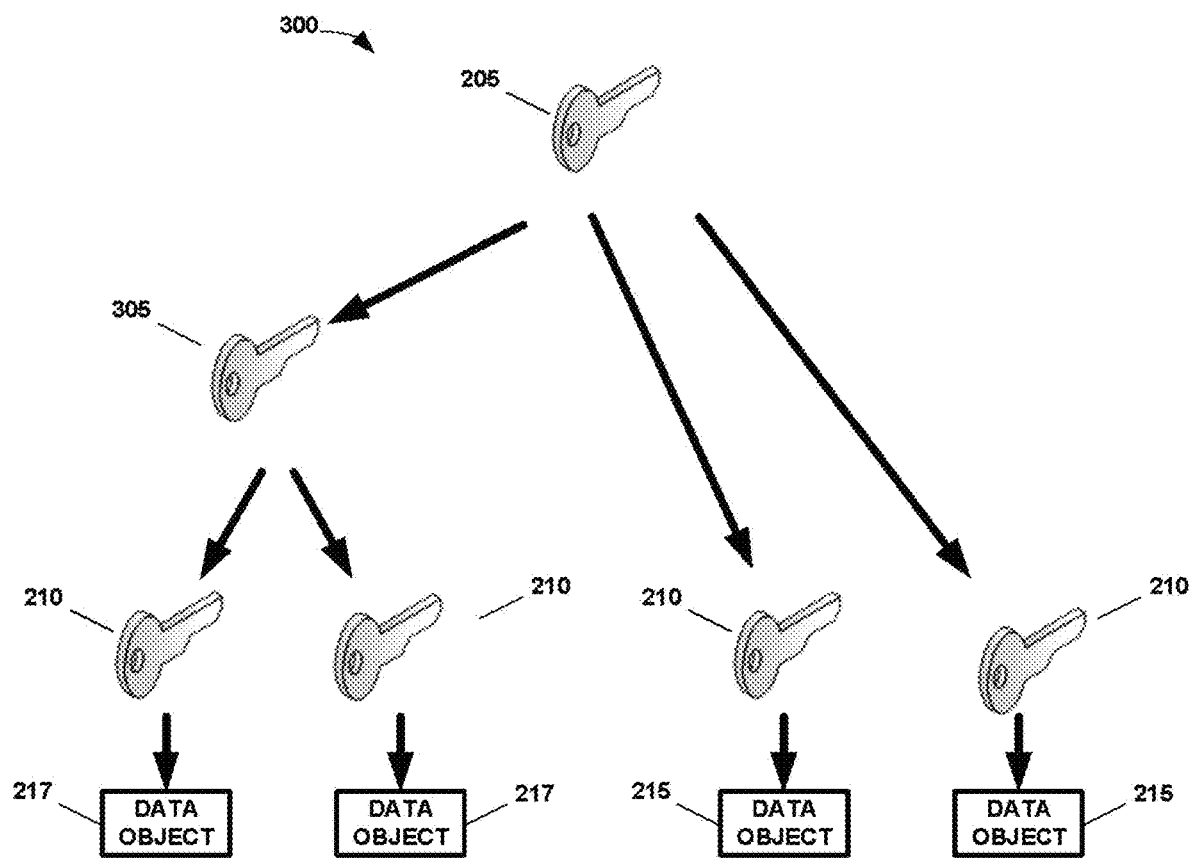
FIG. 3 illustrates an example hierarchical key system that, in addition to, the hierarchical key system of FIG. 2, includes secured data objects that are shared across nodes within a cluster.

In one example disclosed herein and illustrated in FIG. 2, local data objects are secured using Data Encryption Keys that are encrypted using a Node Key Encryption Key. In another example illustrated in FIG. 3, the hierarchical key system of FIG. 2 is built upon by adding to that hierarchical key system a Storage Class Key Encryption Key encoded from the Node Key Encryption Key and the Data Encryption keys used to secure the shared data objects are encrypted from the Storage Class Key Encryption Key. Local data objects in the hierarchical key system of FIG. 3 are secured in the same manner as they are secured in the example of FIG. 2. In another example illustrated in FIG. 4, the hierarchical key system of FIG. 3 is shown with a plurality of Unlock Key Encryption Keys that may be used to "unlock" and thereby access secured data objects whether local or shared. Table 1 illustrates the various kinds of keys that may be found in the examples of FIG. 2-FIG. 4.

TABLE 1

Types of Keys

| Key | Description |
| --- | --- |
| Data Encryption Key ("DEK") | Random key used to encrypt stored data, each stored object has its own DEK. |
| Storage Class Key Encryption Key ("KEK") | Key used to encrypt DEK of objects shared between nodes. |
| Node KEK | KEK specific to node: encrypts local copies of Storage Class KEK (where used); encrypts DEKs of local objects in identity store. |
| Unlock KEK | Used to encrypt Node KEK and lock secured object store; key produced by unlock protocol; protocols for opening the secure object store by releasing the Node KEK. |

Turning now to the drawings, FIG. 1 conceptually depicts a computing system 100 in accordance with one or more examples of the technique disclosed herein. The computing system 100 includes, in this example, a network 105. However, the technique disclosed herein is not limited to computing systems that are networks and may be used in other types of computing systems. The computing system 100 includes a plurality of nodes 120 (only one indicated) and a secure object store 115. The secure object store 115 is distributed across the nodes 120 as indicated by the dashed lines. A portion 110 (only one indicated) of the secure object store 115 resides on, or is otherwise associated with, each node 120. Subsets of the nodes 120 are grouped into clusters 125. The secure object store 115 also includes a service 130 resident on at least one of the nodes 120 or is distributed across the nodes 120 that performs the functionality described herein related to the securing of the data objects in the store.

The nodes 120 comprise, in this particular example, plurality of virtual machines ("VMs") 135. Virtual machines are created from the physical computing resources of the network 105. The virtual machines are software constructs. The computing system 100 includes a number of software and hardware components whose function it is to instantiate, maintain, and execute the virtual machines. These components assign physical resources of the network 105 such as processors and storage to support the computing requirements of the individual virtual machines. Each virtual machine is therefore not limited to the computing resources of any one physical computing apparatus. This is seamless to the user, potentially provides greater computing ability to the user's computing experience and permits the network 105 to leverage its physical resources to meet the computing demands of its users more efficiently. The instantiation, use, and performance of these virtual machines is well known in the art. The details mentioned immediately above therefore will not be further explored so as not to obscure the claimed subject matter.

The secure object store 115 is, in one particular example, an "Identity Store" that secures information the computing system 100 uses to authenticate the identity of a user and therefrom their authorizations and abilities within the computing system 100. Such information for each user is stored in the secured object store 115 as a "data object" and will include the name of the owner, the owner's level of access, and the owner's associated replica models. Each stored, secured data object in this particular example includes the properties set forth in Table 1 below. The Identity Store includes encrypted data records containing encrypted data, encrypted Storage Class Key Encryption Key records containing the encrypted Storage Class Key Encryption Keys, and encrypted Node Key Encryption Key records containing the encrypted Node Key Encryption Key. Each record contains two main types of data: the stored data or encrypted Key Encryption Key and metadata associated with the encrypted data. The metadata is not encrypted and is not confidential but is integrity protected.

TABLE 2

Stored, Secured Data Object Properties

| Property | Description | Notes |
| --- | --- | --- |
| ID | Unique ID for the stored object | Set when the object is stored |
| Value | The body of the object | Arbitrary binary data |
| Owner | The identity of the owning principal | Set to the ID of the authenticated owner |
| Access Type | The authorization rule for the data | |
| Storage Class | How the data is shared between nodes. | |

Individual data objects (not shown in FIG. 1) used and stored by the nodes 120, as well as other computing resources of the network 105, may be secured in the secure object store 115 using the hierarchical key system 200 shown in FIG. 2. The hierarchical key system 200 includes a Node Key Encryption Key 205 from which the Data Encryption Keys 210 ("DEKs") for individual secured data objects 215 are encrypted. In this example, the data objects 115 are not shared across nodes 120, in FIG. 1, and so are "local". The Data Encryption Keys 210 are therefore stored locally and, the hierarchical key system 200 does not permit sharing across nodes in a cluster.

FIG. 3 illustrates an example hierarchical key system 300 that permits sharing of secured data objects 217 across nodes in a cluster—e.g., the nodes 120 of the cluster 125 in FIG. 1—as well as local data objects 215 as shown in FIG. 2. This hierarchical key system 300 of FIG. 3 includes a Storage Class Key Encryption Key 305 encrypted from the Node Key Encryption Key 205 and from which the Data Encryption Keys 210 are encrypted. Some examples may include different kinds of Storage Class Key Encryption Keys 305. In such examples the Storage Class Key Encryption Key 305 may be considered a Cluster Key Encryption Key and other examples may use other kinds of Storage Class Key Encryption Keys. The Storage Class. Key Encryption Key 305 is stored locally on the nodes to facilitate data sharing across nodes within a cluster.

The encryption mentioned above is, in the illustrated example, a function of the "unlock protocols" by which the data is to be decrypted, or "unlocked", for access. The examples illustrated herein support three unlock protocols—a key splitting unlock protocol, a Stable System Values ("SSV") unlock protocol, and, a Trusted Platform ("TPM") unlock protocol. Other examples may use more or fewer unlock protocols. Other examples may also use unlock protocols other than those discussed herein. The three unlock protocols supported by the illustrated example will now be discussed. Each of these unlock protocols will first be discussed generally after which a more detailed discussion will be presented.

Figure 4:
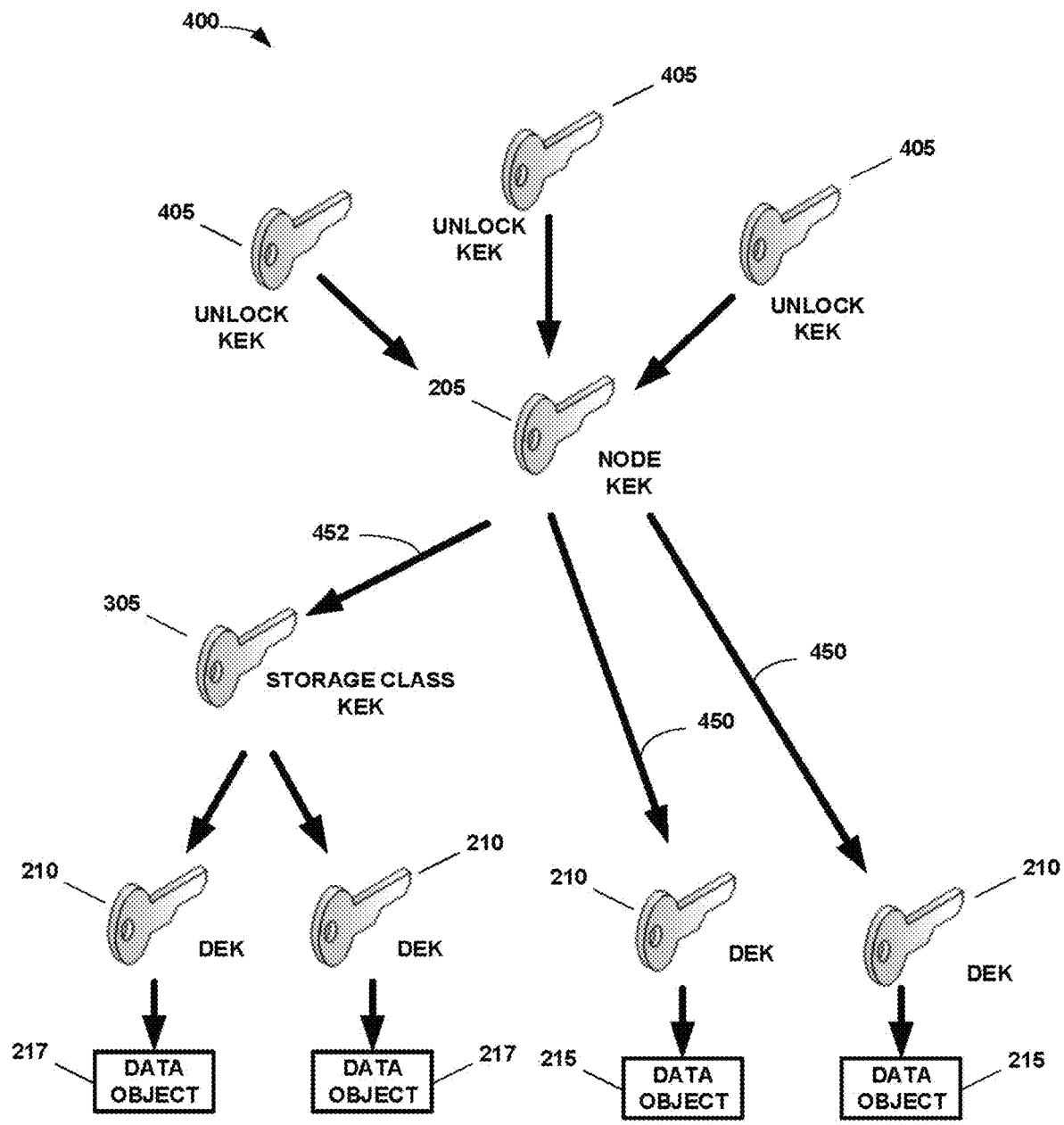
FIG. 4 illustrates an example hierarchical key system that includes the hierarchical key system of FIG. 3 and the Unlock Key Encryption Keys generated by its unlock protocols to secure access to the shared secured data, objects of FIG. 3 and the local secured data objects of FIG. 2 and FIG. 3.

Under the key splitting unlock protocol, an Unlock Key Encryption Key 405, shown in FIG. 4, is generated randomly and split into multiple shares using Shamir Secret Splitting paradigm. Note that there are other key splitting paradigms and these may be used in addition to or in lieu of the Shamir Secret Splitting paradigm. The shares are distributed between nodes in the computing system 100—e.g., the nodes 120 of the secure object store 115 in FIG. 1. The Shamir Secret Splitting paradigm is a (k, n) threshold protocol under which a secret is split into n shares in a manner that allows it to be regenerated if at least k<n of those shares are available. This paradigm allows the split Unlock Key Encryption Key 405 to be regenerated and the Node Key Encryption Key 205 unwrapped if at least k of the shares stored on the n nodes 120 can be retrieved.

The shares generated using this paradigm will be stored in the clusters of the deployment—e.g., the cluster 125 of the secure object store 115 in FIG. 1. The Unlock Key Encryption Key is split into the same number of shares as there are clusters 125 and each cluster 125 has a different share relative to the other clusters 125. The number of shares and the number required to recover the Unlock Key Encryption Key 205 will therefore depend on the number of clusters 125 in the deployment. The protocol will therefore re-split the Unlock Key Encryption Key 205 and redistribute it between the clusters 125 whenever it is opened and whenever clusters 125 are added or removed from the system.

Still referring to FIG. 1 and FIG. 4, the Stable System Values ("SSV") unlock protocol also uses the Shamir Secret Splitting paradigm to split a random Unlock Key Encryption Key 405 into shares, but instead of being distributed between the nodes 120 in the cluster 125, the shares are instead stored locally encrypted under keys generated from stable system values obtained from the host. Since the Shamir Secret Splitting paradigm is a (k, n) threshold protocol, the SSV method can recover the Unlock Key Encryption Key 405 as long as at least k of the SSV remain the same. In order to make this paradigm harder to attack, a different set of SSVs will be used each time the secure object store 115 is locked. The SSV unlock protocol will retrieve more SSVs from the host than are used to encrypt the shares, select a subset of n SSVs, and use the selected SSVs to encrypt the shares as described above.

Under the SSV unlock protocol, the secured object store 115 can only be opened if at least k of the n SSVs retrieved during the unlock operation are the same as when it was locked. Since these values might change over time, the secured object store 115 will re-split the Unlock Key Encryption Key 405 and encrypt the shares of the current SSVs whenever it is opened. The stable system value unlock protocol therefore will recover the Unlock Key Encryption Key 405 using the current set of SSVs, re-split the recovered Unlock Key Encryption Key 405, and re-encrypt the shares using the current SSVs.

Support for TPMs for secured object store unlock is available where the node(s) 120 support virtual TPMs. In such an environment, the Unlock Key Encryption Key 405 will be protected by wrapping it under a public key of a key pair generated by the TPM that is wrapped using the Storage Root Key of the TPM. This unlock protocol will allow an object to either be local to the node or shared between other nodes and will also permit it to be shared with multiple groups of nodes.

More particularly, as described above and referring to FIG. 1 and FIG. 4, the top-level encryption key of the system—e.g., the Node Key Encryption Key 205 in FIG. 4—is stored encrypted within one or more encrypted Node Key Encryption Key records encrypted under the Unlock Key Encryption Key of an unlock protocol—e.g., an Unlock Encryption Key 405 in FIG. 4. The purpose of the unlock protocol is to allow the secure object store 115 in FIG. 1 to be locked and unlocked. The secure object store 115 is locked by using an unlock protocol to generate an Unlock Key Encryption Key 405 and using that Unlock Key Encryption Key 405 to encrypt the Node Key Encryption Key 205. The secure object store 115 is unlocked by using the same unlock protocol to recover the Unlock Key Encryption Key 405 and decrypting the Node Key Encryption Key 205. The Node Key Encryption Key 205 is the top-level encryption key of the secure object store 115 and, once recovered, permits the data in that store to be decrypted.

Each unlock protocol includes at least two properties. The first is an unlock protocol ID that identifies the unlock protocol and a set of configuration parameters. The configuration parameters provide unlock protocol specific configuration information. Each unlock protocol supports at least two operations. The first is a generate operation by which the unlock protocol, generates the Unlock Key Encryption Key 405, shown in FIG. 4, and the second is a recovery operation by which the unlock protocol re-generates the Unlock Key Encryption Key 405 from the state of the data object 215.

Turning now to the particular unlock protocols in the illustrated, examples, in the key splitting unlock protocol the Unlock Key Encryption Key 405 is randomly generated and then split using Shamir Secret Splitting into n shares such that k of those shares are used to recreate the key. (The protocol is based upon the fact that it takes k points to define a polynomial of degree k−1.) This unlock protocol includes at least two parameters: n, the total number of shares to generate, and k, the minimum number of shares used to regenerate the key. The n shares are then distributed among the n clusters in the secure object store.

The generation operation begins by generating a random Unlock Key Encryption Key U. The Unlock Key Encryption Key U is then split into n shares with a threshold of k by choosing a prime number P for the finite field where U<P. In the illustrated example, the prime number P is static and is a part of the configuration data. The generation operation then chooses k−1 random positive integers $a_1, a_2, \ldots, a_{k-1}$ where $a_i$<P. Next, a polynomial of order k−1 is constructed in the form $f(x)=a_0+a_1 x+a_2 x^2+a_3 x^3+ \ldots +a_{k-1}x^{k-1}$ where $a_0$=U. The generation operation then constructs a set of n shares $S=\{s_1, s_2, \ldots, s_n\}$ from the polynomial where $s_i$=f(i). Then, n shares $S=\{s_1, s_2, \ldots s_n\}$ are distributed among the nodes. Table 2 illustrates how n and k may vary with the total number of clusters N. Note that for small deployments of one or two clusters, k=1; meaning that the key is not split but stored directly in the secure object store of the target cluster(s). The shares can be distributed between n clusters and it will be possible to regenerate the Unlock Key Encryption Key as long as at least k of those clusters are available.

TABLE 3

Relationship Among n, k, and N

| N  | n  | k | Notes |
|----|----|---|-------|
| 1  | 1  | 1 | Unlock Key Encryption Key stored in only cluster. |
| 2  | 2  | 1 | Either cluster can be available. |
| 3  | 3  | 2 | Two of the clusters must be available. |
| 4  | 4  | 3 | Three of the clusters must be available. |
| 5  | 5  | 3 | Three of the clusters must be available. |
| 6  | 6  | 4 | Four of the clusters must be available. |
| 7  | 7  | 4 | Four of the clusters must be available. |
| 8  | 8  | 5 | Five of the clusters must be available. |
| >8 | >8 | 6 | Six of the clusters must be available. |

Table 3 is but one example of how n and k can vary with the number of clusters N. The objective is to split the key U into n shares and store one share in each cluster so that only k<n of those shares are required to recover it. That is, the key can be recovered if some of the clusters are not available. However, this approach works better for large numbers of clusters than for small numbers of clusters. If there is only one cluster (N'=1) then there is no splitting and the key is simply stored in that cluster. If N=2 then the key is not split either but stored in both clusters. Once N≥3 it is possible to split the key so that not all clusters are required to recover it.

The Unlock Key Encryption Key recovery operation retrieves the shares from the clusters in the deployment and recovers the Unlock Key Encryption Key 405 using those retrieved shares. It employs as input parameters the locally stored persistent state (i.e., the prime number P) and the configuration parameters (i.e., a the total number of shares generated, and k, the minimum number of shares for key regeneration). The recovery operation then recovers the shares $S'=\{s'_1, s'_2, \ldots s'_n\}$ from the clusters. If at least k of the a shares are retrieved, then the recovery operation reconstructs the polynomial f(x) of order k−1 from the recovered shares and recovers the Unlock Key Encryption Key U=f(0).

Some examples may re-split the Unlock Key Encryption Key 405 in the key splitting unlock protocol in some circumstances. The number of shares a and the number of shares k used to recover the key will depend upon the total number of clusters in the deployment. The protocol therefore regenerates the Unlock Key Encryption Key 405 and redistributes it between the clusters 125, shown in FIG. 1, whenever it is opened and whenever clusters 125 are added or removed from the system. It recovers the Unlock Key Encryption Key 405 using the current set of clusters 125 (note, that there will not be a share on the new or removed cluster 125) and generates a new Unlock Key Encryption. Key 405 using, the current set of clusters 125.

The SSV unlock protocol is similar to the Key Splitting unlock protocol in that the Unlock Key Encryption Key 405 is split into shares, but the shares are then stored locally protected using Stable System Values (SSVs) rather than being distributed. Assuming a set of a system values $V=\{v_1, v_2, \ldots, v_n\}$, the Unlock Key Encryption Key 405 is split into a set of n shares $S=\{f(1), f(2), \ldots, f(n)\}$. The unlock protocol assumes that the SSVs are unique to whatever system is hosting the secured object store 115 and stable over time but does allow some drift. As Shamir is a (k, a) threshold unlock protocol, a key split into a shares that are encrypted using SSVs can be recovered if at least k<n of the SSVs remain the same when the secure object store is opened. For example, if a (5, 7) unlock protocol is used then seven SSVs are used to encrypt the seven shares then the Unlock Key Encryption Key 405 can be recovered as long as five are correct. The SSV unlock protocol accepts as inputs n, the total number of shares to generate and k the minimum number of shares for regenerating the key.

The generation operation generates a random Unlock Key Encryption Key U and splits it into n shares of k using a Shamir Secret Splitting and encrypts the shares using n stable system values. More particularly, the Unlock Key Encryption Key U is split by choosing a prime number P for the finite field where U<P. The prime number P is a part of the configuration data. The generation operation then chooses k−1 random positive integers $a_1, a_2, \ldots, a_{k-1}$ where $a_i$<P. Next, a polynomial of order k−1 is constructed in the form $f(x)=a_0+a_1x+a_2x^2+a_3x^3+ \ldots +a_{k-1}x^{k-1}$ where $a_0$=U. A set of n shares $S=\{f(1), f(2), \ldots, f(n)\}$ is then constructed from that polynomial. Then, n stable system values are selected by retrieving the system values $V=\{v_1, v_2, \ldots, v_N\}$ from the host, where N>n before constructing a set of n shares $S=\{f(1), f(2), \ldots, f(n)\}$ from the polynomial. The generation operation then selects n stable system values $V=\{v_1, v_2, \ldots, v_n\}$, generates a pseudorandom number generator seed.

The seed is then used, to select 17 system values $V'=\{v'_1, v'_2, \ldots, v'_n\}$, where $V' \subset V$. The shares are then encrypted under the SSVs by encrypting each share $s_i$ using a key derived using Password-Based Key Derivation 2 ("PBKDF2") to produce the set of encrypted shares such that $E=\{e_1, e_2, \ldots, e_n\}$, where $e_i$=Enc(KDF($v'_i$), $s_i$), where KDF is the Key Derivative Function. The persistent states generated is the pseudorandom number generator seed, and the encrypted shares E.

Some examples may use a different set of SSVs each time the secure object store is locked. A set of N SSVs may be retrieved where N>n, the total number of shares to generate. A random subset of n SSVs can then be selected from the set N and used to encrypt the shares as described above.

The Unlock Key Encryption Key recovery operation for the SSV unlock protocol retrieve the same stable system values as were used to generate the Unlock Key Encryption Key 405, decrypts the encrypted Unlock Key Encryption Key shares using those values, and recovers the Unlock Key Encryption Key 405 using the shares. The recovery operation receives as inputs the persistent state (i.e., the pseudorandom number generator seed, and the encrypted shares E) and the configuration parameters (i.e., n, the total number of shares generated, and k, the minimum number of shares used to regenerate the key).

The recovery operation begins by retrieving the n SSVs. This includes retrieving the stable system values $V=\{v_1, v_2, \ldots, v_N\}$ from the host, where N>n. The pseudorandom number generator seed is used to select n system values $V'=\{v'_1, v'_2, \ldots, v'_n\}$, where $V' \subset V$. The recovery operation then decrypts each encrypted share $e_i$ under a key derived from the corresponding SSV $v'_i$ using PBKDF2 to produce the set of recovered shares $S'=\{s'_1, s'_2, \ldots, s'_n\}$ where $s'_i$=Dec(KDF($v'_i$), $e_i$). The Unlock Key Encryption Key U is then recovered by reconstructing the polynomial f (x) of order k−1 from the recovered shares before revering the Unlock Key Encryption Key U=f(0).

Under this SSV unlock protocol, the Unlock Key Encryption Key 405 can only be recovered if at least of k of the n SSVs retrieved during the unlock operation are the same as when it was locked. Since these values might change over time, the secure, object store 115 is locked using the current SSVs and is locked at least once following reboot. This means that the Unlock Key Encryption Key 405 should be re-split and the shares re-encrypted using the current SSVs whenever the Unlock Key Encryption Key 405 is recovered.

The TPM, unlock protocol operates on a Trusted Platform Module, which is secure hardware that acts as a hardware root of trust and provides a secure protocol for storing encryption keys. TPM includes at least the following features: attestation (a secure hash chain for providing secure boot), binding (encryption using the TPM as a key store), and sealing (a secure key store that will decrypt if the TPM is in a specified state). If the host hardware supports TPMs and access to guests then the TPM can be used to protect the Node Key Encryption Key 205 by wrapping it under a key pair (not shown) protected by the Storage Root Key("SRK") on the TPM. In this manner, the Unlock Key Encryption Key 405 can only be retrieved if the original TPM hardware is used for decryption, the secure object store 115 is in a known state, and the VM 135 has access to the SRK password.

The lock operation (i.e., generate operation for the TPM protocol) begins by generating a random Unlock Key Encryption Key 405 and wraps the Unlock Key Encryption Key 405 using a public key of a Rivest-Shamir-Adleman ("RSA") key pair generated by the TPM. The RSA Key Pair private key is wrapped using the SRK public key and protected using an SRK password and a platform configurable register ("PCR") linked to the OVC state. The persistent state generated is the wrapped Unlock Key Encryption Key 405 and an encrypted RSA Key Pair.

The unlock operation (i.e., the recovery operation for TPM) receives as input parameters the Encrypted Node Key Encryption Key 405 and the persistent state (i.e., the wrapped Unlock Key Encryption Key and an encrypted RSA Key Pair). To unlock the Node Key Encryption Key 205, the protocol loads the RSA key pair into the TPM so that the TPM can unwrap it using the SRK and pass the wrapped Unlock Key Encryption Key 405 to the TPM so that the TPM can unwrap it using the RSA key.

FIG. 4, then, conceptually illustrates the full hierarchical key system 400, including the Unlock Key Encryption Keys 405 from the Unlock Key Encryption Keys 405 to the local data objects 215 and the shared data objects 217. Note that there are three Unlock Key Encryption Keys 405, one for each supported unlock protocol. The Secure Object Store 115 is running on the nodes 120, shown in FIG. 1, in the computing system 100 and stores data encrypted under per data object Data Encryption Keys 210. If the data is local to a specific node 120 as indicated by the arrows 450 then the Data Encryption Key 210 is encrypted directly under the Node Key Encryption Key 205. If the data is shared with other nodes 120 in the computing system 100 as indicated by the arrow 452, then the Data Encryption Key 210 is encrypted under a Storage Class Key Encryption Key 305. All nodes 120 of the same Storage Class have a copy of the Storage Class Key Encryption Key 305 and the encrypted data is shared between the nodes 120 of the cluster 125.

All encryption and unlocking in this particular example is performed as described above relative to the key splitting unlock protocol, the Stable System Values ("SSV") unlock protocol, and the Trusted Platform ("TPM") unlock protocol. Note, however, that not all unlock protocols may be applicable or desirable in all examples or for all nodes in a given computing system. Those in the art having the benefit of this disclosure will appreciate, for example, that the TPM unlock protocol is dependent on the host hardware supporting TPM. Within the computing, system 100 shown in FIG. 1, some nodes 120 may be more suited for the key splitting unlock protocol whereas other nodes 120 may be more suited to the SSV unlock protocol.

Figure 5:
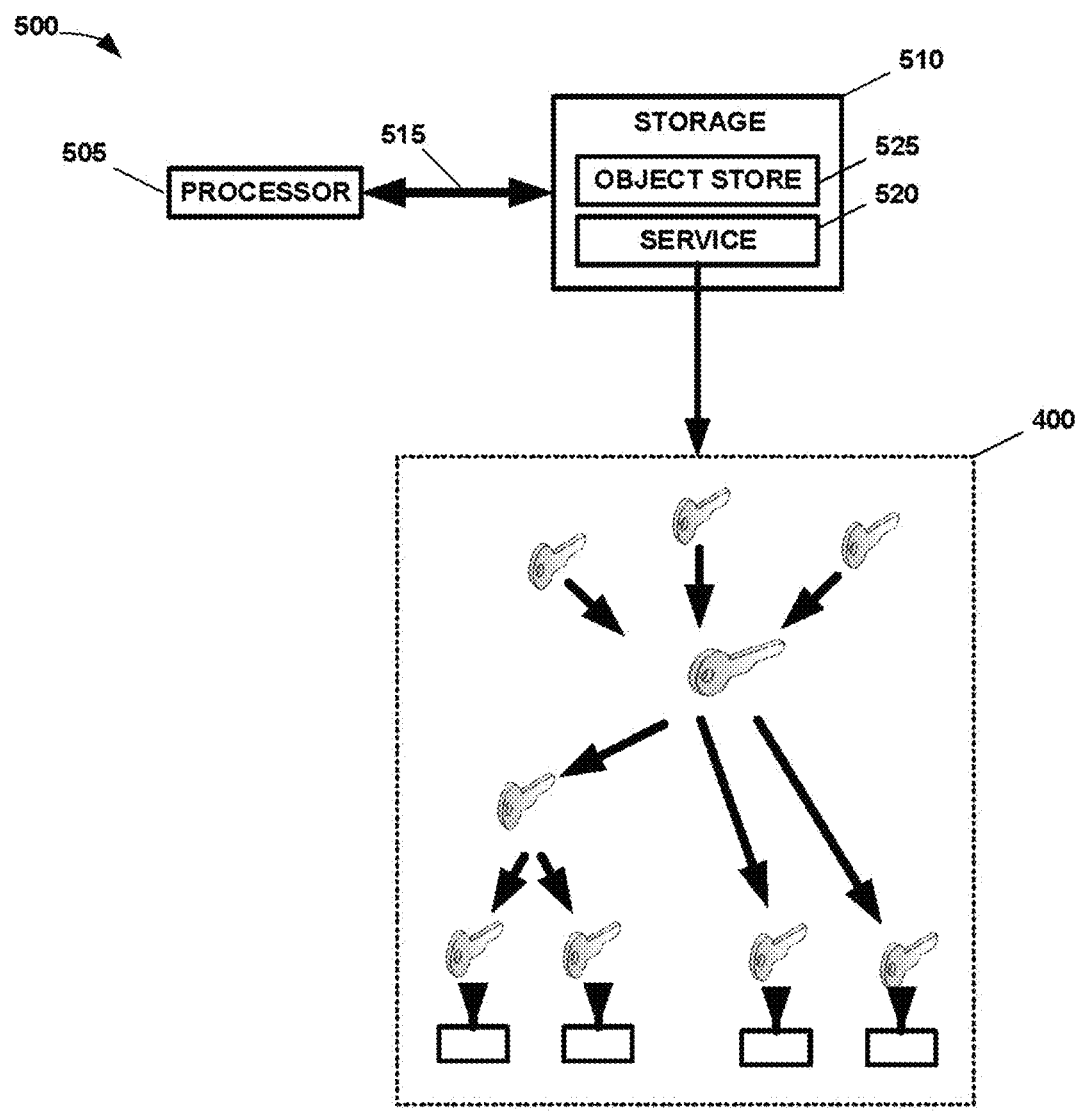
FIG. 5 conceptually depicts selected portions of a hardware and software architecture in an example computing environment.

FIG. 5 conceptually depicts selected portions of a hardware and software architecture 500 in an example computing environment. Note that this architecture is the physical portions for the computing system 100 that may form a portion of the nodes 120 in FIG. 1. The architecture 500 includes a processor 505 communicating with a storage 510 over a communications medium 515. The processor 505 may be a microprocessor, a microprocessor set, or a plurality of microprocessors or microprocessor sets distributed across a plurality of physical computer apparatus within the computing system 100. The storage 510 is similarly flexible in implementation and may be, for example, a mass storage device, a server, or memory devices (e.g., hard, disks or solid-state drives) distributed across a plurality of physical computing apparatus within the computing system 100. The communication medium 515 will depend to some degree on the implementation of the processor 505 and the storage 510 but may include wired links (electrical or optical), wireless links, and the like.

Residing on the storage 510 are the secure object store 520 and a service 520. The service 520 may be considered a part of the secure object store 525 in some examples. The service 520 performs the functionality associated with the secure object store 525 described above, particularly with the encryption, unlocking, storing, and accessing of the data objects. Note that the architecture 500 in FIG. 5 is but one example and that other examples may use different architectures.

Figure 6:
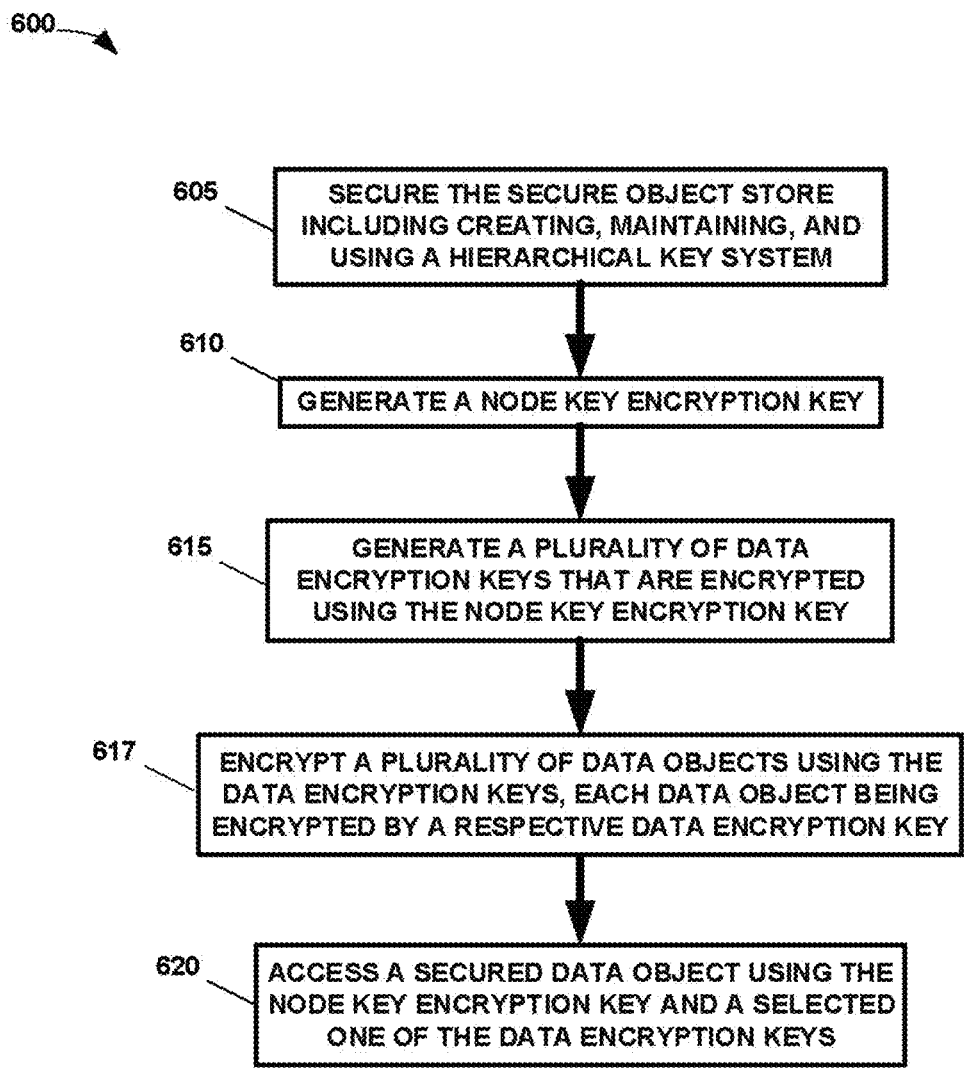
FIG. 6 illustrates a method in accordance with one or more examples of the technique disclosed herein.

FIG. 6 depicts a method 600 for use in managing a secure object store in a computing system. The method 600 begins by securing (at 605) the secure object store including creating, maintaining, and using a hierarchical key system. This includes (at 610) generating a Node Key Encryption Key, (at 615) generating a plurality of Data. Encryption Keys that are encrypted using the Node Key Encryption Key, and encrypting (at 617) a plurality of data objects using the Data Encryption Keys, each data object being encrypted by a respective Data Encryption Key. Then, the method 600 accesses (at 620) a secured data object using the Node Key Encryption Key and a selected one of the Data Encryption Keys.

Figure 7:
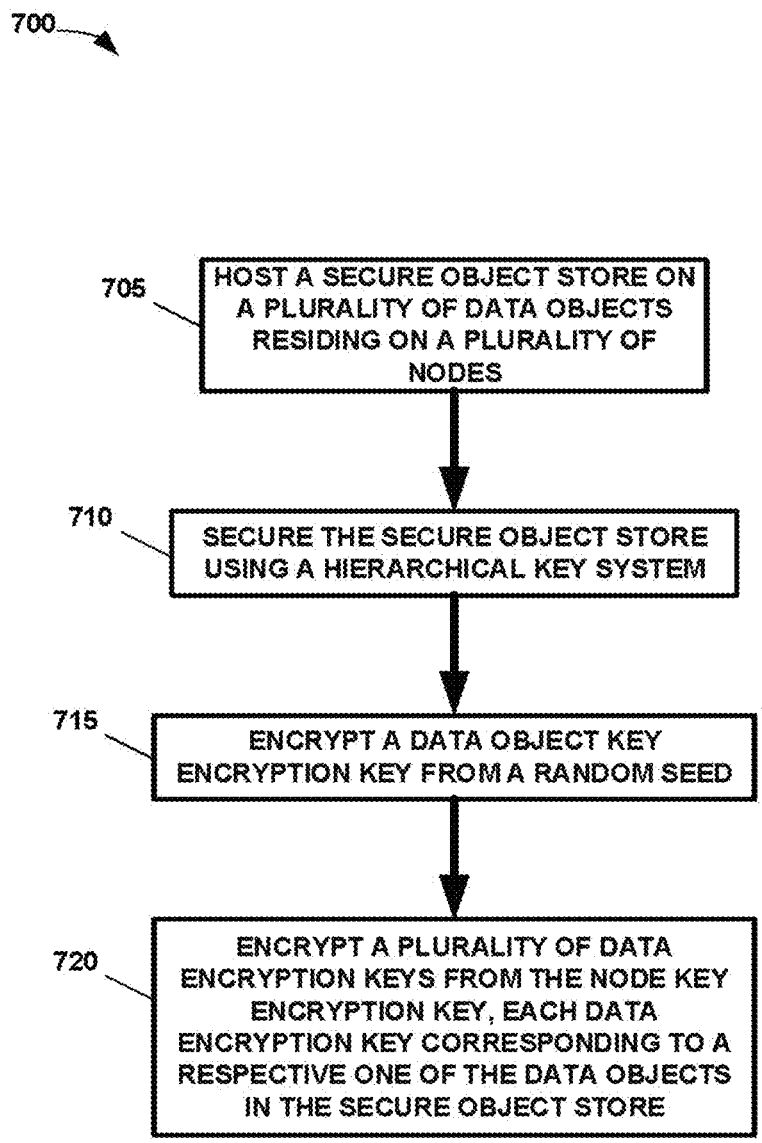
FIG. 7 illustrates a method in accordance with one or more examples of the technique disclosed herein.

FIG. 7 illustrates another method 700 for use in a computing system. The method 700 begins by hosting (at 705) a secure object store on a plurality of nodes of the computing system. The secure object store then uses (at 710) a hierarchical key system. The hierarchical key system (at 715) encrypts a Node Key Encryption Key from a random seed and encrypts (at 720) a plurality of Data Encryption Keys from the Node Key Encryption Key, each corresponding to a respective one of the data objects stored in the secure data store.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation use physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium. The claimed subject matter is not limited by these aspects of any given implementation.

The particular embodiments disclosed above are illustrative only, as examples described herein may be modified and practiced in different but equivalent manners apparent to those skilled in the art having the benefit of the teachings herein. Furthermore, no limitations are intended to the details of construction or design herein shown, other than as, described in the claims below. It is therefore evident that the particular embodiments disclosed above may be altered or modified and all such variations are considered within the scope and spirit of the appended claims. Accordingly, the protection sought herein is as set forth in the claims below.

What is claimed is:

1. A method including:
    securing a secure object store in a computing system, wherein securing the secure object store includes creating, maintaining, and using a hierarchical key system, and the securing including:
        generating a Node Key Encryption Key, wherein the Node Key Encryption Key is associated with a given node of a plurality of nodes;
        generating a plurality of Data Encryption Keys that are encrypted using the Node Key Encryption Key; and
        encrypting a plurality of data objects using the Data Encryption Keys to provide a plurality of encrypted data objects to be stored on the given node, wherein each data object of the plurality of data objects is encrypted by a respective Data Encryption Key, is associated with a different user of a plurality of users, and contains data representing a level of access of the associated user; and
        accessing an encrypted data object of the plurality of encrypted data objects using the Node Key Encryption Key and a selected Data Encryption Key of the Data Encryption Keys.

2. The method of claim 1, wherein the secure object store comprises an identity store.

3. The method of claim 1, wherein securing the secure object store further includes:
    generating a Storage Class Key Encryption Key;
    encrypting the Storage Class Key Encryption Key under the Node Key Encryption Key; and
    generating a plurality of Data Encryption Keys from the Storage Class Key Encryption Key.

4. The method of claim 3, wherein the Storage Class Key Encryption Key and the Data Encryption Keys are used to share data across the plurality of nodes within a cluster.

5. The method of claim 1, wherein accessing the encrypted data object includes unlocking the encrypted data object using the Node Key Encryption Key and the selected Data Encryption Key in one of multiple unlock protocols.

6. The method of claim 5, wherein the unlock protocols include a key splitting unlock protocol, a stable system values unlock protocol, and a trusted platform module unlock protocol.

7. The method of claim 1, wherein the hierarchical key system associates access control rules with a respective encrypted data object of the plurality of encrypted data objects.

8. The method of claim 1, wherein each node of the plurality of nodes corresponds to a different virtual machine of a plurality of virtual machines.

9. A computing system comprising:
    a secure object store comprised of a plurality of data objects residing on a plurality of nodes; and
    a hardware processor to execute instructions to implement a hierarchical key structure, wherein the hierarchical key structure includes:
        a Node Key Encryption Key, wherein the Node Key Encryption Key is associated with a given node of a plurality of nodes; and
        a plurality of Data Encryption Keys, each Data Encryption Key corresponding to a respective data object of the plurality of data objects,
    wherein the hardware processor to execute the instructions to:
        generate the plurality of Data Encryption Keys using the Node Key Encryption Key;
        encrypt the plurality of data objects using the Data Encryption Keys to provide a plurality of encrypted data objects to be stored on the given node, wherein each data object of the plurality of data objects is encrypted by a respective Data Encryption Key, is associated with a different user of a plurality of users, and contains data representing a level of access of the associated user; and
        access an encrypted data object of the plurality of encrypted data objects using the Node Key Encryption Key and a selected Data Encryption Key of the Data Encryption Keys.

10. The computing system of claim 9, wherein the secure object store comprises an identity store.

11. The computing system of claim 9, wherein:
    a subset of the nodes is grouped to form a cluster; and
    the hierarchical key system includes a Storage Class Key Encryption Key encrypted using the Node Key Encryption Key and from which the Data Encryption Keys of the data objects residing on the subset of nodes are encrypted.

12. The computing system of claim 11, wherein the Storage Class Key Encryption Key and the Data Encryption Keys are used to share data across a plurality of nodes within the cluster.

13. The computing system of claim 9, wherein the Node Key Encryption Key and the Data Encryption Key are unlocked using one of multiple unlock protocols.

14. The computing system of claim 13, wherein the unlock protocols include a key splitting unlock protocol, a stable system values unlock protocol, and a trusted platform module unlock protocol.

15. The computing system of claim 9, wherein each Node Key Encryption Key of the plurality of Node Key Encryption Keys associates access control rules with a respective encrypted data object of the plurality of encrypted data objects.

16. A method for use in a computing system, comprising:
hosting a secure object store including a plurality of data objects on a plurality of nodes of a computing system;
securing the secure object store using a hierarchical key system including:
encrypting a given Node Key Encryption Key of a plurality of Node Key Encryption Keys, wherein the given Node Key Encryption Key is associated with a given node of the plurality of nodes; and
encrypting a plurality of Data Encryption Keys from the given Node Key Encryption Key, wherein each Data Encryption Key of the plurality of Data Encryption Keys corresponds to a respective data object of the plurality of data objects, each data object of the plurality of data objects is encrypted by a respective Data Encryption Key of the plurality of Data Encryption Keys to provide a corresponding encrypted data object of a plurality of encrypted data objects, each data object of the plurality of data objects is associated with a different user of a plurality of users, and each data object of the plurality of data objects contains data representing a level of access of the associated user.

17. The method of claim 16, wherein the secure object store comprises an identity store.

18. The method of claim 16, further comprising:
grouping a subset of the nodes in a cluster; and
wherein securing the secure object store includes:
generating a Storage Class Key Encryption Key;
encrypting the Storage Class Key Encryption Key under the Node Key Encryption Key; and
generating a second plurality of Data Encryption Keys from the Storage Class Key Encryption Key.

19. The method of claim 18, wherein the Storage Class Key Encryption Key and the second plurality of Data Encryption Keys are used to share data across a plurality of nodes within the cluster.

20. The method of claim 16, further comprising accessing a given encrypted data object of the plurality of encrypted data objects, including unlocking the given encrypted data object using the Node Key Encryption Key and a Data Encryption Key of the plurality of Data Encryption Keys in one of multiple unlock protocols.

21. The method of claim 16, wherein each Node Encryption Key of the plurality of Node Key Encryption Keys associates access control rules with a respective encrypted data object of the plurality of encrypted data objects.

* * * * *